Feb. 21, 1950  M. N. STOLLERY  2,498,307
SIGNALING APPARATUS FOR AUTOMOBILES
Filed March 12, 1947  2 Sheets-Sheet 1
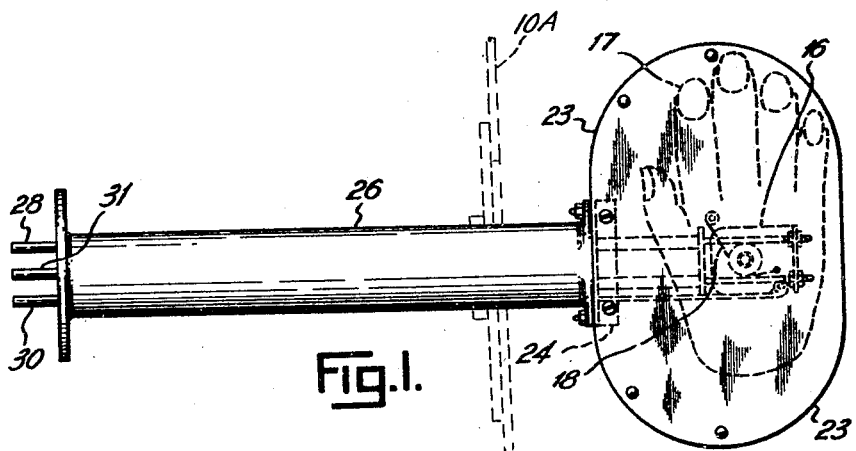
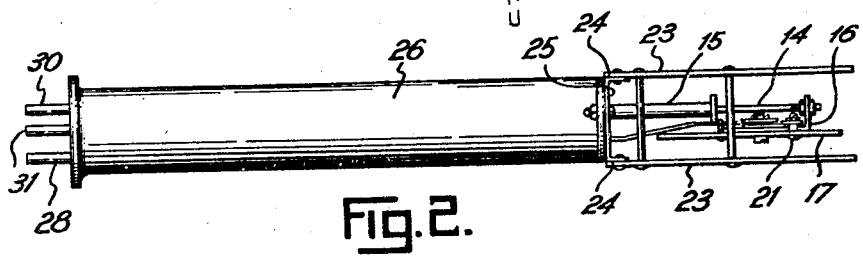
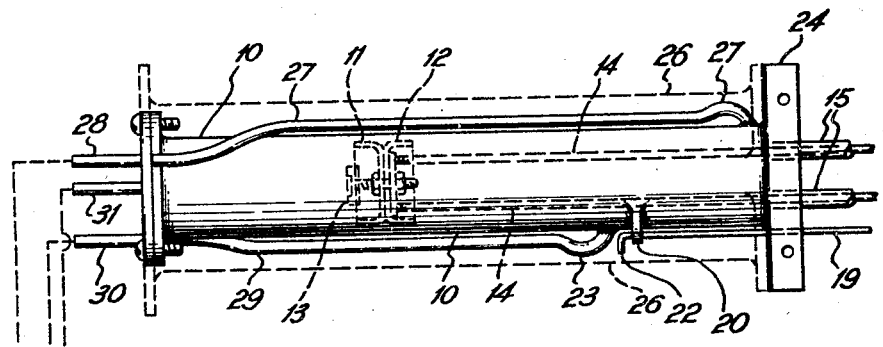
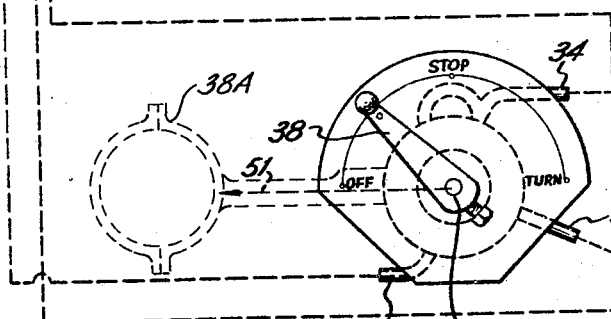
Inventor
M. N. Stollery Feb. 21, 1950 M. N. STOLLERY 2,498,307
SIGNALING APPARATUS FOR AUTOMOBILES
Filed March 12, 1947 2 Sheets-Sheet 2
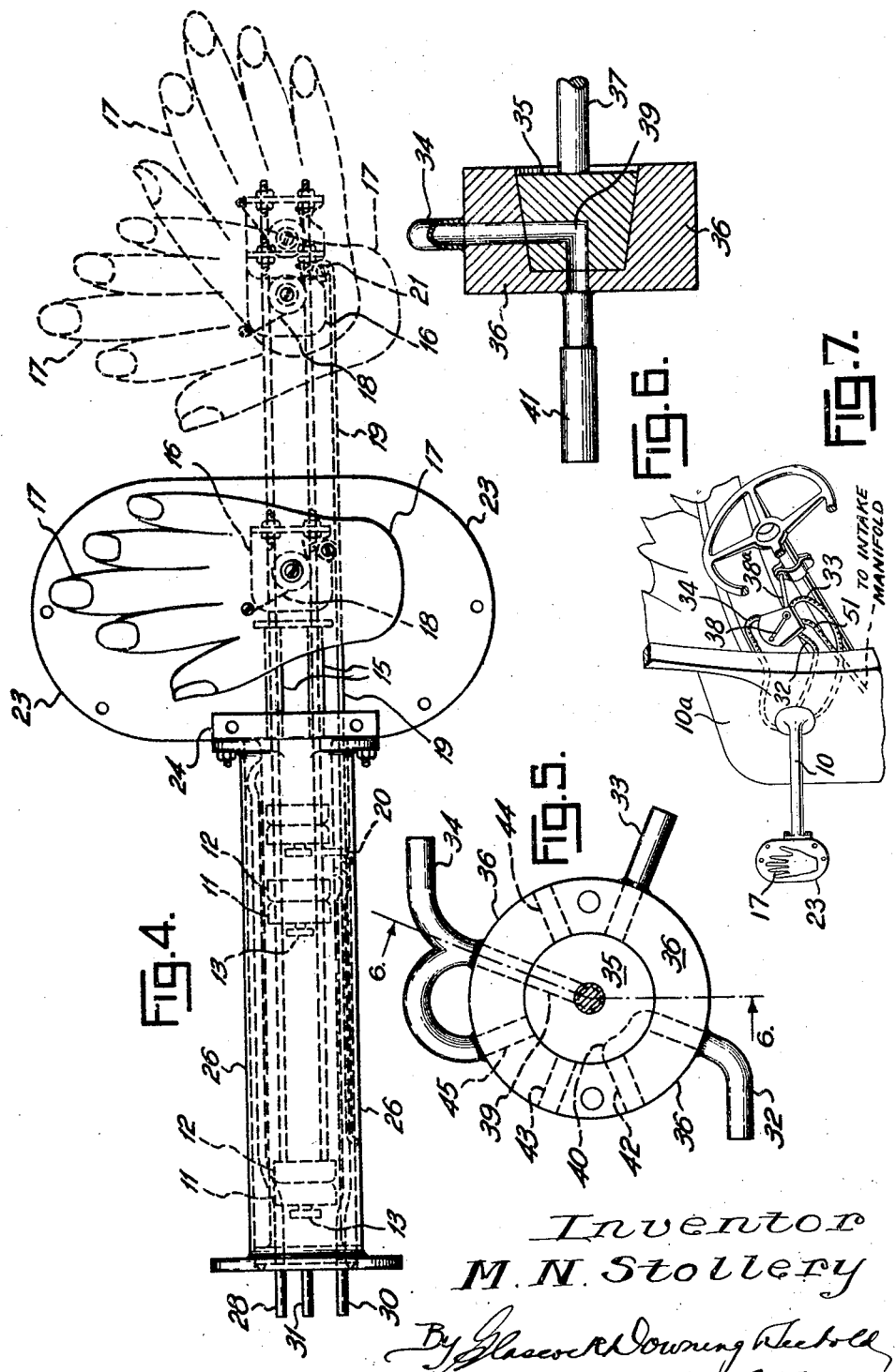
Inventor
M. N. Stollery Patented Feb. 21, 1950

2,498,307

UNITED STATES PATENT OFFICE 2,498,307

SIGNALING APPARATUS FOR AUTOMOBILES

Matthew Nolan Stollery, Paddington, near Sydney, New South Wales, Australia

Application March 12, 1947, Serial No. 734,199
In Australia March 18, 1946

1 Claim. (Cl. 116—39)

This invention relates to signalling apparatus for use on automobiles to indicate the driver's intention of stopping or turning as the case may be.

Although applicable to power driven vehicles generally, this invention should prove of particular value on motor propelled trucks, lorries, and vans, and on omnibuses, in many of which vehicles the body extends well over the chassis and partly obscures hand signals made by the driver.

Many attempts have been made to provide satisfactory apparatus for the foregoing purpose, and the present inventor is aware of at least one earlier invention which depended for its operation on suction induced by the power unit of the vehicle, and applied through medium of a vacuum tank under control of a multi-way valve.

The present invention also depends on pneumatic means for its operation and has been devised primarily in order to provide relatively simple and compact means whereby readily discernible signals simulating those given by hand, can be quickly and positively communicated.

A feature of this invention is that the signalling means proper normally lies in a casing which can be conveniently mounted on the body of any of the beforementioned vehicles, and wherein said signalling means will be safely housed when not in use.

In order however that the invention may be fully understood and readily carried into practical effect, reference is now made to the drawings accompanying and forming part of this complete specification, wherein:

Figure 1 is an elevation of a preferred form of the casing for housing the signalling means proper;

Figure 2 is a plan thereof.

Figure 3 is an enlarged elevation of the tubular portion of the casing shown by Figure 1, with its outer shell removed, and indicating by broken lines the manner in which it is connected to a multi-way valve.

Figure 4 is an enlarged elevation of the casing shown by Figure 1, with a plate removed to show the signalling means proper, and with the latter indicated in broken lines in its "Stop" and "Turn" position;

Figure 5 is an enlarged elevation of the multi-way valve indicated in broken lines in Figure 3;

Figure 6 is a section of the multi-way valve taken on the plane 6—6 indicated in Figure 5, and Figure 7 is a perspective view, partly in section, showing its signalling apparatus of the present invention mounted on the side of a motor vehicle and the multi-way control valve mounted on its steering column.

The casing illustrated in Figures 1, 2, 3 and 4 of the drawings includes a cylinder 10 (see Figure 3). This casing with cylinder 10 attached may, for instance, be mounted on the side wall 10a (Fig. 7) of the driver's cabin of a truck. In the cylinder 10 there is a plunger comprising two opposed hat-leathers 11 and 12 and a washer 13. This plunger is secured to the inner ends of twin rods 14 which pass through tubular guides 15 at one end of the cylinder 10, the outer ends of said rods 14 being secured to a bracket 16 which has pivoted to it indicator 17 representing a hand. This indicator normally is held in vertical position by a spiral spring 18.

There is also a tie rod 19 slidably held in a lug 20 which may be sweated onto cylinder 10 (see Figures 3 and 4) one end being attached to indicator 17 as by a screw 21, and its other end 22 being bent to engage said lug 20 (see Figure 3).

Plates 23 obscure the indicator 17 and serve to protect it against damage in its normal position. These are secured to flanges 24 which are formed on an end cover for a shell 26 which encloses the cylinder 10.

A tube 27 (see Figure 3) leads from the right hand extremity of cylinder 10 to a nipple 28 at the opposite end of the cylinder, and tube 29 leads from an intermediate point in the cylinder to a nipple 30. A third nipple 31 communicates with the left hand end of the cylinder. These three nipples 28, 30 and 31 are connected by suitable tubing to nipples 32, 33 and 34, respectively, of the multi-way valve indicated in Figures 3 and 5 and 6. On reference to these three figures it will be seen that the multi-way valve has a plug 35 rotatable in chest 36. This plug 35 has a stem 37 to which handle such as 38 is secured. The multi-way valve would be so mounted in the vehicle that handle 38 would occupy a convenient position on the instrument board or adjacent to the steering wheel. In Figure 7 a bracket 38a is provided for facilitating the mounting of the multi-way valve in the steering column of the vehicle.

In the plug there is a passage 39 (see Figure 6) and a peripheral groove 40. The passage 39 is in constant communication with a nipple 41 projecting from rear of chest 36. This nipple 41 would be placed in communication with the intake manifold of the engine by suitable tubing (indicated by 51 in Figures 3 and 7) or in communication with a vacuum tank on the vehicle.

The chest 36 also has radial passages 42, 43, and 44 formed in it for communication with atmosphere; and there is a further passage 45 in communication with nipple 34.

It should be observed in perusing the following description that the indications "Off," "Stop" and "Turn" in Figure 3 do not relate to the respective nipples adjoining them.

In use, when the driver is about to turn right he moves the handle 38 of the multi-way valve to the right so that passage 39 will register with nipple 32 and allow suction to be exerted at the extreme right hand end of cylinder 10 through tube 27. When this occurs the plunger will be drawn throughout the length of the cylinder, moving rods 14 and with it the bracket 16 carrying the indicator 17.

When the plunger has moved to such extent that the bent end 22 of tie rod 19 engages lug 20 the indicator 17 is then still in a vertical position, but on further movement of the plunger the indicator is tilted into horizontal position as indicated by Figure 4, by virtue of the connection to tie rod 19.

After the turn has been accomplished, the driver moves handle 38 to its "Off" position. Suction is then exerted, through passage 39 and nipple 34, at the left hand end of the cylinder, to fully retract the plunger. For this operation the plug 35 of the multiple-way cock would lie in the position indicated in Figure 5 where it will be seen that the peripheral groove 40 admits air through nipple 32 and tube 27 to the right hand end of the cylinder.

When the driver is about to stop the vehicle and as a consequence moves handle 38 accordingly, suction is exerted in cylinder 10 through medium of nipple 33 and tube 29, when the plunger will only move until it blocks the mouth of that tube. The indicator will then be in the vertical position as indicated by broken lines in Figure 4.

After the vehicle has stopped, the handle 38 should be returned to the "Off" position.

To prevent constant suction on the plunger when it is in its normal or inoperative position, the washer 13 serves to block mouth of the nipple 31.

It will be appreciated that the tubes 27 and 29 could, if desired, be formed in the wall of the cylinder 10.

I claim:

Improved signalling apparatus for automobiles comprising, a cylinder mounted in a tubular case adapted to be secured to the body of the vehicle, a lug on said cylinder, separated plates secured to flanges at one end of said tubular case, a plunger in said cylinder and affixed to a pair of rods extending from the latter, a bracket carried by the rods an indicator in the form of a hand pivoted to said bracket and normally disposed between said plates, spring means normally retaining said indicator in a vertical position, a tie rod connected at one end to said indicator and slidable in said lug on said cylinder, said tie rod being bent at its other end to engage said lug and tilt said indicator into a horizontal position against the tension of the spring means, nipples on said cylinder through which suction can be exerted to move said plunger to one of three positions at which said indicator will be withdrawn or communicate a "Stop" or "Turn" signal, and multi-way valve connected to said nipples and in communication with the intake manifold of the automobile.

MATTHEW NOLAN STOLLERY.

REFERENCES CITED

The following references are of record in the file of this patent:

UNITED STATES PATENTS

| Number | Name | Date |
|---|---|---|
| 1,731,964 | Amsler | Oct. 15, 1929 |
| 2,141,980 | Hansen | Dec. 27, 1938 |
| 2,402,255 | Marcus | June 18, 1946 |